(12) United States Patent
Niu et al.

(10) Patent No.: US 9,199,324 B2
(45) Date of Patent: Dec. 1, 2015

(54) HOLDING WRENCH

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Jun Niu, Shenzhen (CN); Ya-Peng Lei, Shenzhen (CN); Peng Chen, Shenzhen (CN); Shu-Ping Wang, Shenzhen (CN); Zhan-Wei Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 280 days.

(21) Appl. No.: 13/963,297

(22) Filed: Aug. 9, 2013

(65) Prior Publication Data

US 2014/0186131 A1    Jul. 3, 2014

(30) Foreign Application Priority Data

Dec. 29, 2012    (CN) .......................... 2012 1 0588492

(51) Int. Cl.
*B23G 1/26*    (2006.01)
*B25B 13/46*    (2006.01)

(52) U.S. Cl.
CPC ................ *B23G 1/261* (2013.01); *B23G 1/265* (2013.01); *B25B 13/46* (2013.01); *Y10T 408/639* (2015.01); *Y10T 408/643* (2015.01)

(58) Field of Classification Search
CPC .... B25B 13/46; B25B 13/461; B25B 13/463; B23G 1/26; B23G 1/261; B23G 1/265; B23G 1/043; Y10T 408/63; Y10T 408/637; Y10T 408/639; Y10T 408/641; Y10T 408/643; B25G 3/12; B25G 3/14; B25G 3/16
USPC ..................... 408/120, 121, 122, 122.5, 123; 81/60–63.2, 177.2, 177.5
See application file for complete search history.

(56) References Cited

U.S. PATENT DOCUMENTS 916,620 A * 3/1909 Shaul ................................ 7/142
1,173,516 A * 2/1916 Holzscheiter ................... 408/57

(Continued)

FOREIGN PATENT DOCUMENTS

TW    201000269 A    1/2010

*Primary Examiner* — Daniel Howell
*Assistant Examiner* — Nicole N Ramos
(74) *Attorney, Agent, or Firm* — Novak Druce Connolly Bove + Quigg LLP

(57) ABSTRACT

A holding wrench includes a clamping assembly and a pair of handles. The clamping assembly includes a housing, a transmission gear, a first latching member, a second latching member, and an adjusting subassembly. The first latching member and the second latching member engage with the transmission gear. The adjusting subassembly includes an adjusting member, a pair of pushing members protruding from the adjusting member, and a pair of resisting members. The adjusting member defines a pair of latching grooves. The pair of pushing members is located between the first latching member and the second latching member. When the adjusting member is moved toward the second latching member, one of the pair of pushing member pushes the second latching member away from the transmission gear, and the pair of resisting members latches into the pair of latching grooves, thereby positioning the adjusting member.

18 Claims, 5 Drawing Sheets

(56) References Cited

U.S. PATENT DOCUMENTS

| | | | |
|---|---|---|---|
| 1,241,428 A * | 9/1917 | Nitz | 408/122 |
| 2,233,091 A * | 2/1941 | Becker | 192/45.1 |
| 2,701,977 A * | 2/1955 | Stone | 81/63.2 |
| 3,491,616 A * | 1/1970 | Albert | 74/625 |
| 6,216,563 B1 * | 4/2001 | Hsieh | 81/63.2 |
| 7,299,720 B1 * | 11/2007 | Schultz et al. | 81/63.1 |
| 2004/0244543 A1 * | 12/2004 | Barnett et al. | 81/62 |
| 2007/0107558 A1 * | 5/2007 | Junkers | 81/57.39 |
| 2009/0308209 A1 * | 12/2009 | Cross et al. | 81/109 |
| 2009/0320649 A1 * | 12/2009 | Hu | 81/63.1 |

* cited by examiner

HOLDING WRENCH

BACKGROUND

1. Technical Field

The present disclosure relates to a holding wrench, and more particularly to a manual holding wrench.

2. Description of Related Art

In the industrial machining field, a holding wrench is employed to tap a workpiece or rotationally cutting a screw. The holding wrench includes a clamping assembly and a pair of handles connected to opposite ends of the clamping assembly. The clamping assembly holds a tapping member or a sleeve. When tapping, two hands clasp the pair of handles to rotate the tapping member. However, the two hands must interchange positions after rotating a large amount of angular rotation, and it is difficult to control the force of tapping, which may fracture the tapping member. When interchanging positions of the two hands, it is easy to lose clasping force, which results in a mal-position of the tap member relative to the workpiece. Thus, efficiency is reduced.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
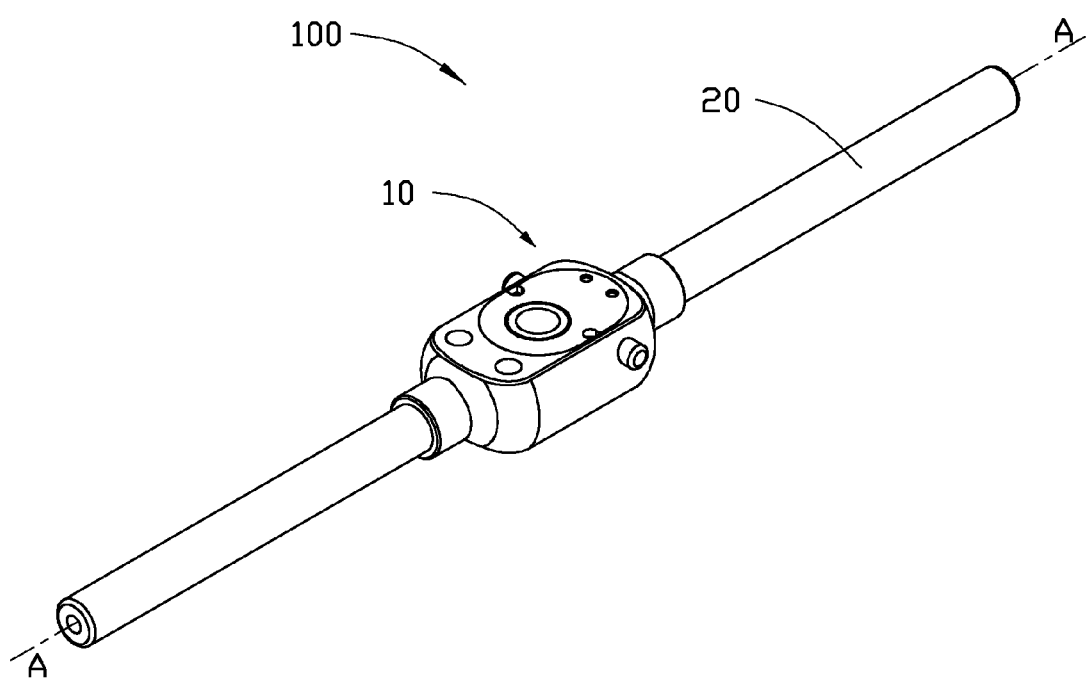
FIG. 1 is an isometric view of an embodiment of a holding wrench.

Referring to FIG. 1, an embodiment of a holding wrench 100 includes a clamping assembly 10 and a pair of handles 20 extending from opposite ends of the clamping assembly 10. The clamping assembly 10 is employed to clamp a tap member (not shown). An operator may clasp the pair of handles 20 and rotate the holding wrench 100 along an axial axis of the clamping assembly 10 to tap a workpiece. The clamping assembly 10 may also clamp a sleeve to cut a screw.

Figure 2:
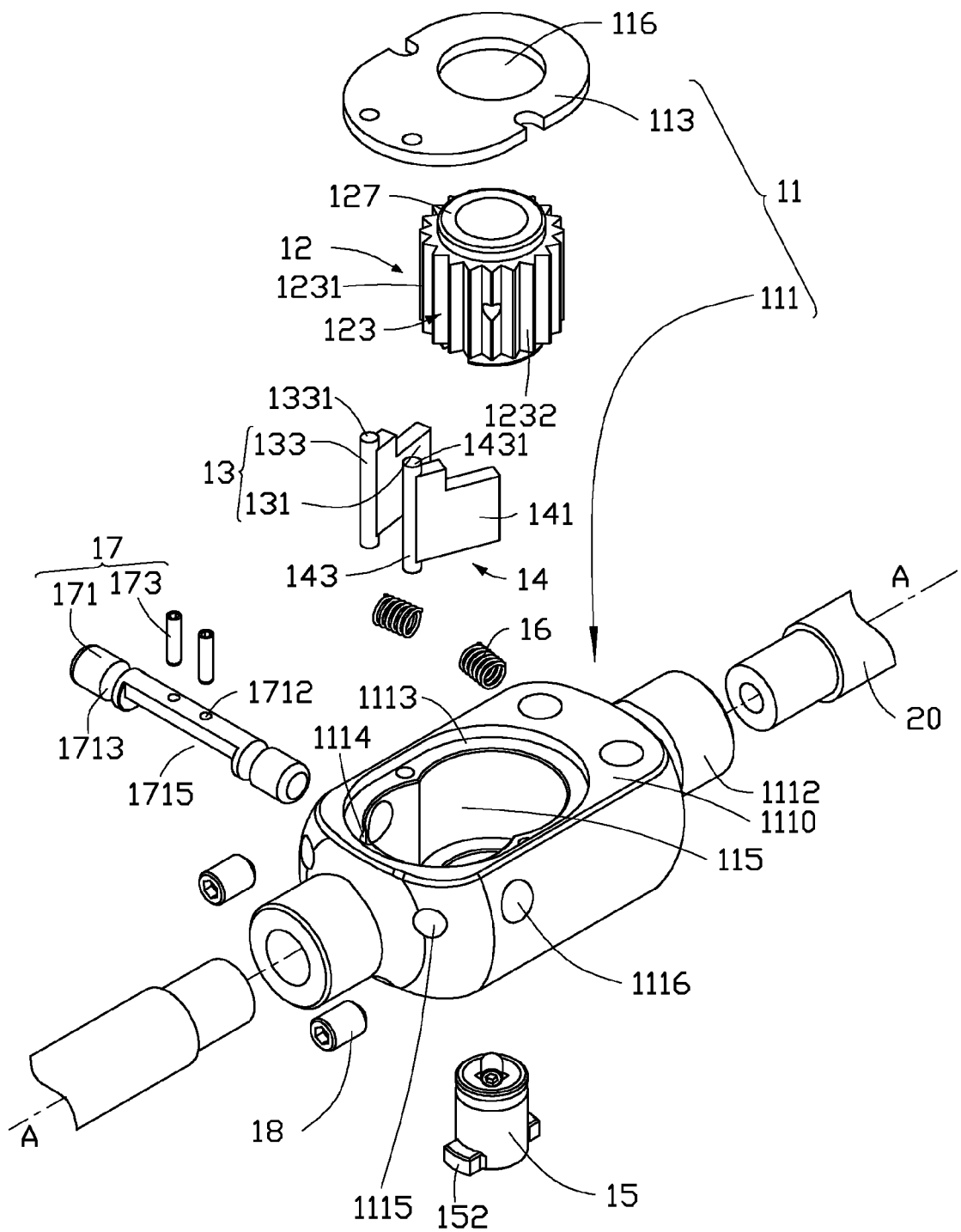
FIG. 2 is an exploded, isometric view of the holding wrench of FIG. 1.
Figure 3:
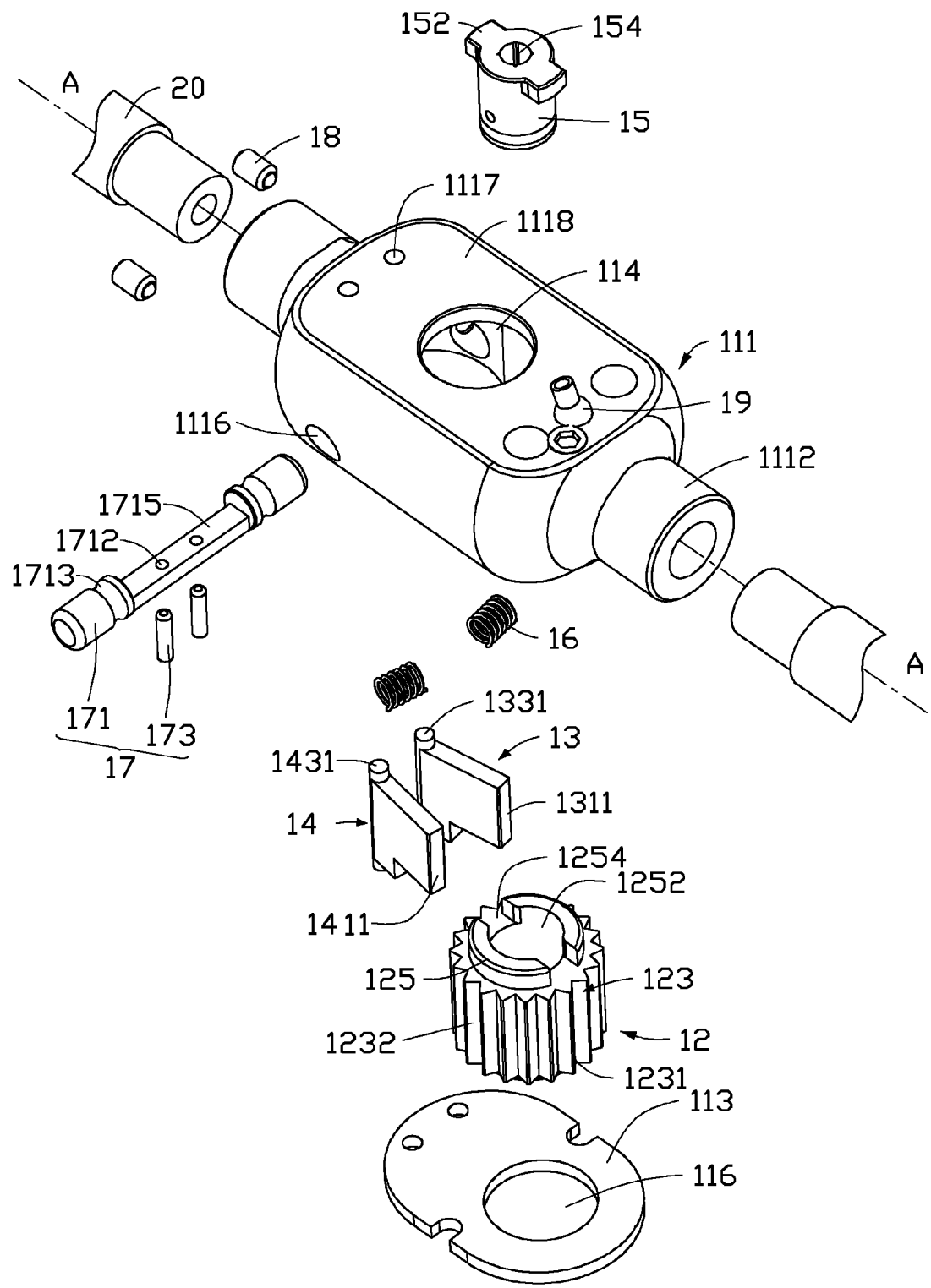
FIG. 3 is similar to FIG. 2, but viewed from another aspect.
Figure 4:
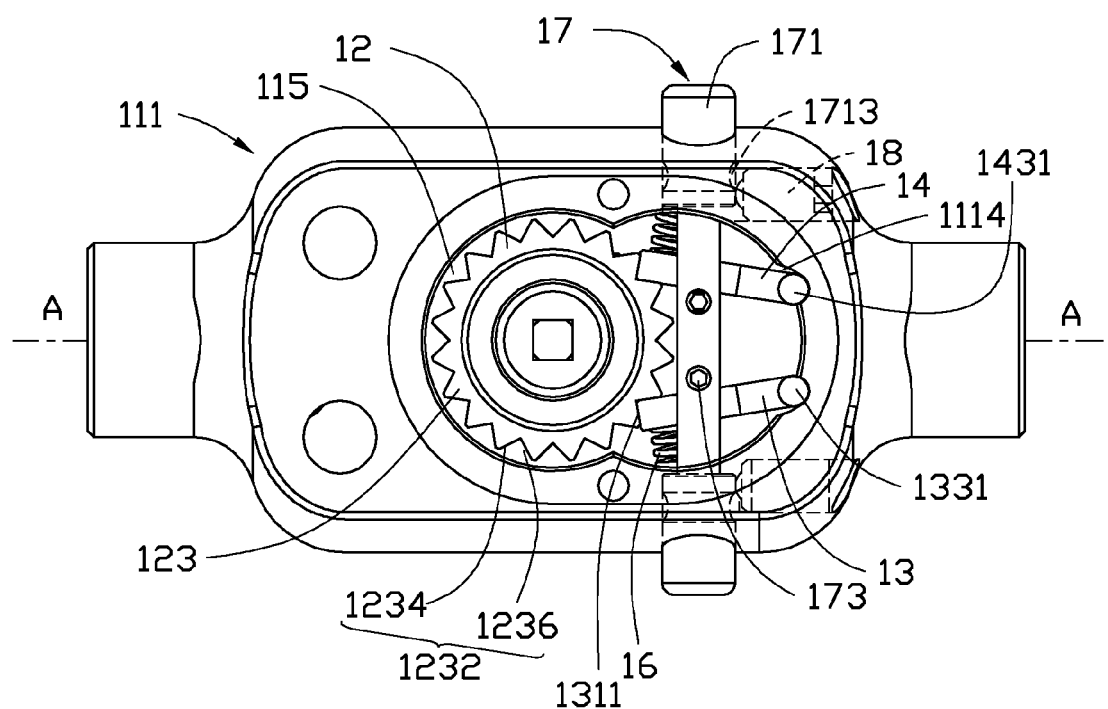
FIG. 4 is a top plane view of a part of the holding wrench of FIG. 1 in a releasing state.

Also referring to FIGS. 2 through 4, the clamping assembly 10 includes a housing 11, a transmission gear 12, a first latching member 13, a second latching member 14, a clamping member 15, a pair of resilient members 16, an adjusting subassembly 17, a pair of resisting members 18, and an air blower head 19 (referring to FIG. 3). The transmission gear 12, the first latching member 13, the second latching member 14, the clamping member 15, the pair of resilient members 16, the adjusting subassembly 17, and the pair of resisting members 18 are received in the housing 11. The first latching member 13 and the second latching member 14 latch with the transmission gear 12, and the clamping member 15 is assembled to an end of the transmission gear 12 for mounting the tap member. The pair of resilient members 16 pushes the first latching member 13 and the second latching member 14 toward the transmission gear 12, respectively. The adjusting subassembly 17 is assembled to the housing 11, and is employed to push the first latching member 13 or the second latching member 14 away from the transmission gear 12. The pair of resisting members 18 resists the adjusting subassembly 17 and positions the adjusting subassembly 17 on the housing 11. The air blower head 19 is connected to the housing 11 and communicates with chamber 15 for removing dust and residues out of the housing 11 by supplying air into one of the handle 20.

The housing 11 includes a main body 111, a shielding cover 113 assembled to the main body 111, and a pair of holding portions 1112 on opposite ends of the main body 111 for holding the pair of handles 20. The main body 111 is substantially a hollow cuboid structure, and includes a first surface 1110 and a second surface 1118 opposite to the first surface 1110. The first surface 1110 and the second surface 1118 are substantially rounded rectangular in shape, and parallel to each other. The main body 111 defines a receiving chamber 115 in a middle portion thereof on the first surface 1110, and a first receiving hole 114 in a middle portion of the second surface 1118. The receiving chamber 115 of the main body 111 communicates with the first receiving hole 114 thereof. A protruding rib 1113 extends inwardly from an inner sidewall of a periphery of the receiving chamber 115. The protruding rib 1113 is substantially annular, and supports the shielding cover 113. The protruding rib 1113 defines a pair of restriction cutouts 1114 (see FIG. 2) at an edge thereof. The second surface 1118 defines a pair of restriction holes 1117 therein corresponding to the pair of restriction cutouts 1114 (see FIG. 3). The main body 111 defines a pair of through holes 1115 at an end of the main body 111, and a pair of inserting holes 1116 at opposite sides of the main body 111. The pair of through holes 1115 communicates with the receiving chamber 115 and is located at two sides of one of the holding portions 1112 for receiving the pair of resisting members 18, respectively. The pair of inserting holes 1116 is adjacent to the pair of through holes 1115, respectively, and communicates with the receiving chamber 115 for mounting the adjusting subassembly 17. The shielding cover 113 is assembled to the protruding rib 1113 and sealing the receiving chamber 115. The shielding cover 113 defines a second receiving hole 116 aligned with the first receiving hole 114. The first receiving hole 114 and the second receiving hole 116 cooperatively hold the transmission gear 12. The first receiving hole 114 is coaxial with the second receiving hole 116, and the first receiving hole 114 and the second receiving hole 116 are located at a central axis of the main body 111.

The transmission gear 12 is substantially hollow and substantially cylindrical, and is received in the receiving chamber 115. The transmission gear 12 is located at a middle part of the main body 11, and a rotation axis of the transmission gear 12 is coaxial with the central axis of the main body 111. The rotation axis of the transmission gear 12 perpendicularly intersects with an axis A of the handle 20. The transmission gear 12 includes an engaging portion 123, a first latching portion 125, and a second latching portion 127. The first latching portion 125 and the second latching portion 127 protrude from opposite ends, respectively, of the engaging portion 123. The engaging portion 123 is equipped with a plurality of gear teeth 1231 arranged around a periphery of the engaging portion 123. Two adjacent gear teeth 1231 define a gear groove 1232 therebetween. Each gear groove 1232 is bound by a first gear surface 1234 and a second gear surface 1236. The first gear surface 1234 is symmetrical to the second gear surface 1236. In the illustrated embodiment, a cross-sectional view of the gear groove 1232 is an isosceles right triangle. The cross-sectional view of the gear groove 1232 may be other symmetrical shapes. The first latching portion 125 and the second latching portion 127 are substantially a cylindrical shell, and both thereof have a diameter less than that of the engaging portion 123. The first latching portion 125 is received in the first receiving hole 114 of the main body 111, while the second latching portion 127 is received in the second receiving hole 116 of the shielding cover 113, such that the rotation axis of the transmission gear 12 is coaxial with the first receiving hole 114 and the second receiving hole 116. The first latching portion 125 axially defines a containing hole 1252, and a pair of holding gaps 1254 at opposite sides of the containing hole 1252. The containing hole 1252 is employed to hold the clamping member 15. The pair of holding gaps 1254 communicates with the containing hole 1252 for preventing the clamping member 15 from rotating relative to the transmission gear 12.

The first latching member 13 and the second latching member 14 have the same shape and are symmetrically mounted on the main body 111. The first latching member 13 and the second latching member 14 are received in the receiving chamber 115 and are located at opposite sides of the axis A. Extending directions of the first latching member 13 and the second latching member 14 cooperatively define an angle therebetween, and the extending of the first and second latching members 13, 14 forms an opening having the angle facing the transmission gear 12. The first latching member 13 includes a latching portion 131 and a fixing portion 133 connected to the latching portion 131. The latching portion 131 includes a latching end 1311 at a distal end thereof away from the fixing portion 133. The latching end 1311 engages with one gear groove 1232 of the transmission gear 12. The fixing portion 133 is substantially rod-shaped and includes a pair of positioning ends 1331 protruding respectively from opposite ends of the fixing portion 133. Each fixing portion 133 is received by a restriction cutout 1114, such that one positioning end 1331 is received by a corresponding restriction hole 1117. Similarly, the second latching member 14 includes a latching portion 141, a fixing portion 143, a latching end 1411, and a pair of positioning ends 1431. The second latching member 14 is received in the receiving chamber 115 similarly as the first fixing latching member 13 143.

The clamping member 15 is mounted in and received by the transmission gear 12. The clamping member 15 is substantially cylindrical. The clamping member 15 axially defines a clamping hole 154 and includes a pair of protrusions 152 protruding from opposite sides thereof. The clamping hole 154 mounts a tapping member (not shown). The pair of protrusions 152 is received in and restricted by the pair of holding gaps 1254 of the transmission gear 12. A cross-sectional dimension of the clamping hole 154 is substantially the same as that of the tapping member. The cross-sectional dimension of the clamping hole 154 may be changed according to different sizes of tapping members.

The pair of resilient members 16 is disposed on opposite sides of the axis A of the handle 20 to push the first latching member 13 and the second latching member 14 toward the transmission gear 12. Opposite ends of one resilient member 16 respectively resist the main body 111 and the first latching member 13, while opposite ends of the other resilient member 16 respectively resist the main body 111 and the second latching member 14. In the illustrated embodiment, the resilient member 16 is a compression spring. In other embodiments, the resilient member 16 may be an elastic clip.

The adjusting subassembly 17 includes an adjusting member 171 and a pair of pushing members 173 assembled substantially perpendicularly to the adjusting member 171. The adjusting member 171 is slidably mounted in the main body 111 and is received in the receiving chamber 115. Opposite ends of the adjusting member 171 are received in the pair of inserting holes 1116, respectively. The adjusting member 171 defines a pair of fixing holes 1712 that extend along a direction perpendicular to an axial direction of the adjusting member 171. The adjusting member 171 further defines a pair of latching grooves 1713 adjacent to opposite ends thereof, respectively. Each latching groove 1713 is an annular groove surrounding a periphery of an end of the adjusting member 171 for partially receiving one end of the resisting member 18. The adjusting member 171 further defines an axial groove 1715 along the axial direction thereof. The axial groove 1715 is substantially strip-shaped. The latching portion 131 of the first latching member 13 and the latching portion 141 of the second latching member 14 support a bottom of the axial groove 1715 to hold the adjusting member 171. The pushing members 173 are substantially cylindrical, and are respectively assembled into the pair of fixing holes 1712 between the first latching member 13 and the second latching member 14. One end of each pushing member 173 protrudes out of the adjusting member 171. The pair of pushing members 173 respectively resists the first latching member 13 and the second latching member 14 to move away from each other.

The pair of resisting members 18 is mounted in the pair of through holes 1115, respectively, and is partially received in the receiving chamber 115. The resisting members 18 respectively resist a bottom of the latching groove 1713 adjacent to the pair of pushing members 173.

The air blower head 19 is mounted on the second surface 1118 of the main body 111 and communicates with the receiving chamber 115. An axial axis of the air blower head 19 forms an acute angle with the second surface 1118. The angle between the air blower head 19 and the second surface 1118 may be changed according to a requirement for removing residues out of the housing 11.

The handle 20 is substantially hollow and substantially cylindrical, and includes two parts, which are respectively mounted to the pair of holding portions 1112. An inner channel is defined in the handle 20 and communicates with the air blower head 19 via the receiving chamber 115. A peripheral surface of the handle 20 undergoes a knurling process to help a user grasp the handle 20.

In assembly, the transmission gear 12 is received in the receiving chamber 115 and is mounted in the main body 111. The first latching member 13 and the second latching member 14 are received in the receiving chamber 115, and are positioned at two sides of the axis A, respectively. The positioning ends 1331, 1431 are rotatably received in the restriction cutouts 1114 and the restriction holes 1117. The latching ends 1311, 1411 are latched into the corresponding gear grooves 1232 of the transmission gear 12. The adjusting member 171 is received in the receiving chamber 115, such that opposite ends of the adjusting member 171 extend out of the main body 111 via the pair of inserting holes 1116, respectively. The pair of pushing members 173 is received by the pair of fixing holes 1712 of the adjusting member 171 to resist the first latching member 13 and the second latching member 14, respectively. The clamping member 15 is mounted in the containing hole 1252 of the transmission gear 12. The pair of resilient members 16 is disposed on opposite sides of the axis A. One resilient member 16 resists the first latching member 13 and the main body 111, while the other resilient member 16 resists the second latching member 14 and the main body 111. The pair of resisting members 18 is mounted in the pair of through holes 1115, respectively, and resists the adjusting member 171. The air blower head 19 is mounted on the second surface 1118 and communicates with the receiving chamber 115. The shielding cover 113 is assembled on the protruding rib 1113 to seal the receiving chamber 115. The handle 20 is assembled to the pair of holding portions 1112 of the housing 11, such that the pair of pushing members 173 do not resist the first latching member 13 and the second latching member 14.

Figure 5:
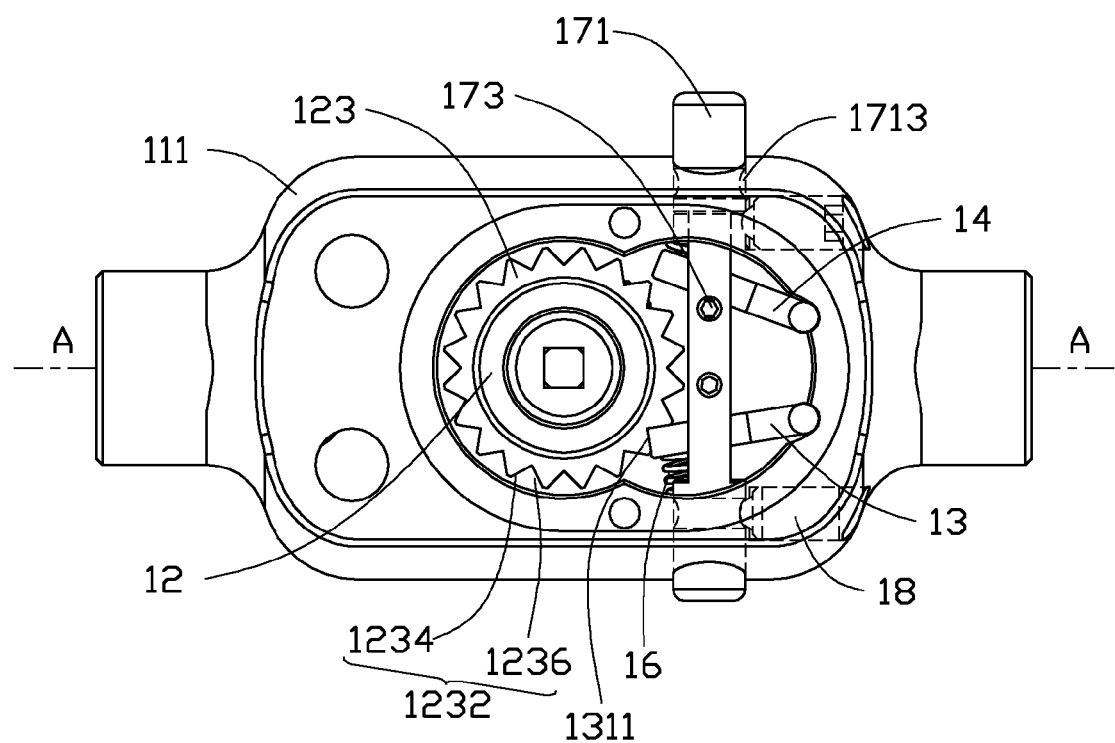
FIG. 5 is similar to FIG. 4, but showing the holding wrench in an occupying state.

Also referring to FIG. 5, when in use, the tapping member is assembled to the clamping hole 154 of the clamping member 15. When the adjusting member 171 is pushed by a user toward the second latching member 14, one pushing member 173 pushes the second latching member 14 away from the engaging portion 123 of the transmission gear 12, while the other pushing member 173 detaches from the first latching member 13, such that the first latching member 13 is held by the engaging portion 123. The pair of resisting members 18 is then latched into the pair of latching grooves 1713 of the adjusting member 171 to hold the adjusting member 171. The handle 20 is rotated clockwise along the central axis of the main body 111, such that the first latching member 13 resists the first gear surface 1234 of the engaging portion 123 to rotate the transmission gear 12, thereby tapping the workpiece by the tapping member. When the handle 20 is rotated to a predetermined angle, the handle 20 is rotated counterclockwise, such that the second gear surface 1236 of the engaging portion 123 resists the first latching member 13, causing the first latching member 13 to compress one of the resilient members 16. The first latching member 13 detaches from the second gear surface 1236 and engages with the (next or subsequent in order) gear groove 1232. Therefore, when the handle 20 is rotated counterclockwise, the first latching member 13 slips from one gear groove 1232 to another gear groove 1232, so that the transmission gear 12 remains axially located. The handle 20 is rotated clockwise and counterclockwise in turn, such that the transmission gear 12 rotates clockwise. In the tapping process, the pressured air is supplied to the receiving chamber 115 via the handle 20, and the pressured air blows detritus out of the housing 11 via the air blower head 19.

When the tapping member enters a predetermined depth of the workpiece, the adjusting member 171 is moved toward the first latching member 13, and is positioned by the pair of resisting members 18. Similarly, the handle 20 is rotated counterclockwise and clockwise in turn, and the transmission gear 12 rotates counterclockwise to tap the workpiece.

In other embodiments, the clamping member 15 may be omitted, such that the tapping member is directly fixed to the transmission gear 12. The air blower head 19 may be omitted, such that some other air supplying mechanism is employed to remove dust. The pair of pushing members 173 may be a pair of posts protruding from the adjusting member 171. The pair of resilient members 16 may be omitted, such that when the rotation direction of the handle 20 is changed, the first latching member 13 and the second latching member 14 move to the transmission gear 12 once a time.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A holding wrench, comprising:
   a clamping assembly, comprising:
      a housing,
      a transmission gear received in the housing,
      a first latching member rotatably received in the housing,
      a second latching member rotatably received in the housing, the first latching member and the second latching member engaging with the transmission gear, respectively,
   an adjusting subassembly comprising:
      an adjusting member slidably mounted on the housing, the adjusting member defining a pair of latching grooves thereon; and
      a pair of pushing members protruding from the adjusting member, and the pair of pushing members resisting the first latching member and the second latching member, respectively, and
   a pair of resisting members mounted on the housing and resisting the adjusting member; and
   a pair of handles respectively connected to opposite ends of the housing, wherein the pair of pushing members is located between the first latching member and the second latching member, when the adjusting member is moved toward the second latching member, one of the pair of pushing members pushes the second latching member away from the transmission gear, the pair of resisting members latches into the pair of latching grooves, thereby positioning the adjusting member.

2. The holding wrench of claim 1, wherein the clamping assembly further comprises a pair of resilient members received in the housing, the pair of resilient members respectively resists the first latching member and the second latching member toward the transmission gear, the first latching member and the second latching member are located between the pair of resilient members.

3. The holding wrench of claim 2, wherein when the adjusting member is moved toward the second latching member, the second latching member is resisted by the corresponding pushing member to compress the corresponding resilient member, the other one of the pair of pushing members detaches from the first latching member.

4. The holding wrench of claim 1, wherein the housing comprises a main body and a shielding cover assembled to the main body, the main body defines a receiving chamber on a top thereof and a first receiving hole on a bottom thereof, the receiving chamber communicates with the first receiving hole, the receiving chamber receives the transmission gear, the first latching member, the second latching member, the adjusting subassembly and the pair of resisting members.

5. The holding wrench of claim 4, wherein the main body comprises a protruding rib extends inwardly from a periphery of the receiving chamber, the shielding cover is assembled to the protruding rib and sealing the receiving chamber, the shielding cover defines a second receiving hole aligned to the first receiving hole, the first receiving hole and the second receiving hole cooperatively holding the transmission gear.

6. The holding wrench of claim 5, wherein the protruding rib defines a pair of restriction cutouts at an edge thereof, the main body defines a pair of restriction holes at a bottom thereof corresponding to the pair of restriction cutouts, one restriction cutout and one restriction hole cooperatively hold the first latching member, and the other one restriction cutout and the other one restriction hole cooperatively hold the second latching member.

7. The holding wrench of claim 6, wherein the main body further defines a pair of through holes at an end thereof and a pair of inserting holes at opposite sides thereof, the pair of through holes and the pair of inserting holes communicates with the receiving chamber, the pair of resisting members is respectively received in the pair of through holes, and opposite ends of the adjusting member are received in the pair of inserting holes, respectively.

8. The holding wrench of claim 1, wherein the housing comprises a main body and a shielding cover assembled to the main body, the main body defines a first receiving hole away from the shielding cover, the shielding cover defines a second receiving hole aligned to the first receiving hole, the transmission gear comprises an engaging portion, a first latching portion and a second latching portion protruding from opposite ends of the engaging portion, the first latching portion is received in the first receiving hole of the main body, the second latching portion is received in the second receiving hole of the shielding cover, the first latching member and the second latching member engages with the engaging portion.

9. The holding wrench of claim 8, wherein the engaging portion is equipped with a plurality of gear teeth arranged around a periphery thereof, two adjacent gear teeth defines a gear groove therebetween, the first latching member and the second latching member engage in different gear grooves, each gear groove is bounded by a first gear surface and a second gear surface symmetrical with the first gear surface, and a cross-sectional view of each gear groove is an isosceles right triangle.

10. The holding wrench of claim 9, wherein the first latching member comprises a latching portion and a fixing portion connected to the latching portion, the latching portion comprises a latching end at a distal end thereof away from the fixing portion to engages with the corresponding gear groove of the transmission gear, the fixing portion comprises a pair of positioning ends protruding from opposite ends at a side of the latching portion, the pair of positioning ends of the fixing portion are rotatably mounted on the main body.

11. The holding wrench of claim 1, wherein the clamping assembly further comprises a clamping member mounted on the transmission gear, the clamping member axially defines a clamping hole thereon and comprises a pair of protrusions protruding from opposite sides thereof, the clamping member is fixed to the transmission gear via the pair of protrusions.

12. A holding wrench, comprising:
 a clamping assembly, comprising:
  a housing,
  a transmission gear received in the housing,
  a first latching member rotatably received in the housing,
  a second latching member rotatably received in the housing,
  an adjusting subassembly comprising:
   an adjusting member slidably mounted on the housing, the adjusting member defining a pair of latching grooves thereon;
   a pair of pushing members protruding from the adjusting member and located between the first latching member and the second latching member, and
   a pair of resilient members received in the housing and respectively resists the first latching member and the second latching member toward the transmission gear; and
  a pair of resisting members mounted on the housing and resisting the adjusting member; and
 a pair of handles respectively connected to opposite ends of the housing, wherein, when the adjusting member is moved toward the second latching member, one of the pair of pushing members pushes the second latching member to compress the corresponding resilient member and away from the transmission gear, and the other one of the pair of pushing members moves away from the first latching member to allow the first latching member engaging with the transmission gear, and the pair of resisting members latches into the pair of latching grooves, thereby positioning the adjusting member.

13. The holding wrench of claim 12, wherein the first latching member and the second latching member are located between the pair of resilient members, when the adjusting member is moved toward the second latching member, the second latching member is resisted by the corresponding pushing member to compress the corresponding resilient member, and the other one of the pair of pushing members detaches from the first latching member.

14. The holding wrench of claim 12, wherein the housing comprises a main body and a shielding cover assembled to the main body, the main body defines a receiving chamber on a top thereof and a first receiving hole on a bottom thereof, the receiving chamber communicates with the first receiving hole, the receiving chamber receives the transmission gear, the first latching member, the second latching member, the adjusting subassembly and the pair of resisting members.

15. The holding wrench of claim 12, wherein the housing comprises a main body and a shielding cover assembled to the main body, the main body defines a first receiving hole away from the shielding cover, the shielding cover defines a second receiving hole aligned to the first receiving hole, the transmission gear comprises an engaging portion, a first latching portion and a second latching portion protruding from opposite ends of the engaging portion, the first latching portion is received in the first receiving hole of the main body, the second latching portion is received in the second receiving hole of the shielding cover, the first latching member and the second latching member engages with the engaging portion.

16. The holding wrench of claim 15, wherein the engaging portion is equipped with a plurality of gear teeth arranged around a periphery thereof, two adjacent gear teeth defines a gear groove therebetween, the first latching member and the second latching member engage in different gear grooves, each gear groove is bounded by a first gear surface and a second gear surface symmetrical with the first gear surface, and a cross-sectional view of each gear groove is an isosceles right triangle.

17. The holding wrench of claim 16, wherein the first latching member comprises a latching portion and a fixing portion connected to the latching portion, the latching portion comprises a latching end at a distal end thereof away from the fixing portion to engages with the corresponding gear groove of the transmission gear, the fixing portion comprises a pair of positioning ends protruding from opposite ends of a side of the latching portion, the pair of positioning ends of the fixing portion are rotatably mounted on the main body.

18. The holding wrench of claim 12, wherein the clamping assembly further comprises a clamping member mounted on the transmission gear, the clamping member axially defines a clamping hole thereon and comprises a pair of protrusions protruding from opposite sides thereof, the clamping member is fixed to the transmission gear via the pair of protrusions.

* * * * *